US007133643B2

(12) United States Patent
Sapashe et al.

(10) Patent No.: US 7,133,643 B2
(45) Date of Patent: Nov. 7, 2006

(54) METHOD AND DEVICE FOR MAINTAINING ENVIRONMENTAL AUDIO AWARENESS IN A SIMPLEX COMMUNICATIONS SYSTEM

(75) Inventors: Darren Sapashe, Delray Beach, FL (US); Long Chanh Lam, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 902 days.

(21) Appl. No.: 10/324,429

(22) Filed: Dec. 20, 2002

(65) Prior Publication Data

US 2004/0120530 A1 Jun. 24, 2004

(51) Int. Cl.
*H04B 17/00* (2006.01)

(52) U.S. Cl. ........................ 455/67.11; 381/57; 381/107

(58) Field of Classification Search ............. 455/67.11, 455/67.13, 63.1; 381/57, 107

See application file for complete search history.

(56) References Cited

U.S. PATENT DOCUMENTS 5,448,620 A * 9/1995 Gershkovich et al. ... 455/552.1
5,790,671 A * 8/1998 Cooper ........................ 381/57

* cited by examiner

*Primary Examiner*—Lee Nguyen

(57) ABSTRACT

A method and device for maintaining environmental audio awareness in a simplex communications system includes the steps of determining if a minimum functionality necessary (10, 11, 12, 22, 30) for environmental sampling in a simplex communications unit (1) is already on (500) and, if the functionality is on, then beginning to sample audio of the environment (700) with the functionality for a sampling time period (800, 900), and, if the functionality is off, then turning on (600) only the functionality and beginning to sample environmental audio (700) with the functionality for the sampling time period (800, 900), and determining, throughout the sampling time period, if an interruption occurs (715) during the sampling time period and, if not, completing the audio sampling (800), turning off (1000) the functionality if communication is not being performed with the unit, and calculating environmental parameters (1100) for adapting communications with the unit, and, if so, turning off (745) the functionality when communication is not being performed with the unit.

31 Claims, 2 Drawing Sheets

METHOD AND DEVICE FOR MAINTAINING ENVIRONMENTAL AUDIO AWARENESS IN A SIMPLEX COMMUNICATIONS SYSTEM

BACKGROUND OF THE INVENTION

1. Field of the Invention:

The invention lies in the field of electronic communications. The invention relates to a method and device for maintaining environmental audio awareness in a simplex communications system.

2. Description of the Related Art:

Two general types of electronic audio two-way communications are used, simplex and duplex. In simplex communications, transmission and reception are communicated over a single communications channel. This means that when one user is transmitting over the channel, if another user transmits as well, neither can hear the other. A typical example of simplex communications is a two-way radio. In duplex communications, transmission and reception are each communicated over a separate communications channel; thus, transmission and reception do not interfere with one another. This means that two users can simultaneously talk to and receive from one another. A typical example of duplex communications is a cellular telephone.

Due to the portability of electronic transceiver units, the surrounding environment plays a significant role in overall quality of transmission and/or reception because the units can be taken, very quickly, from one kind of environment to another. Also, environmental conditions can change rapidly. With regard to reception, if the environment is noisy, then the user has difficulty hearing the, typically, low volume speaker output. To compensate for such an environment, therefore, the speaker can be adjusted by increasing volume or by equalizing the output signal towards frequencies easier to hear with high background noise in general or with the specific kind of background noise actually detected. As for transmission, a noisy environment plays an even greater role, in that, the background noise can, sometimes, completely overtake the communication message (i.e., user's voice), resulting in the receiving user primarily hearing the background noise or, even, only hearing the background noise.

Complex audio processing algorithms are employed to compensate for and/or reduce background noise. To perform such compensation and for correct performance, these algorithms require information relating to current characteristics of the environmental noise. Typically, this information is acquired by periodically sampling the environment. Specifically, the information is acquired by activating the input device in the transceiver unit (i.e., microphone) and measuring the audio environment. The detected audio environment at the input device, then, is used for regulating not only transmission, but also audio output from the receiving speaker of the same device.

Audio processing algorithms require a relatively continuous measurement of the audio environment at each end of a two-way communications link in order to provide environmental audio conditioning. In a duplex system, the microphone path is enabled continuously and can, therefore, provide a constant update of a possibly changing audio environment. In a typical two-way radio simplex system, however, only one path is running. Because the user enables the microphone path (and, therefore, the environmental detection functionality) manually in a simplex system, the environmental conditions of a simplex system are based on the last instance that the microphone path was on. Such manual activation is typically referred to as push-to-talk or PTT. It is, accordingly, possible for user to not enable their microphone path for a long period of time. Such a condition is risky for adequate audio environment compensation because the environmental conditions could have changed significantly since the last time the microphone path was enabled. In such a case, the audio-processing algorithm being employed loses track of the environmental conditions in which the unit is being exposed. Without relatively current information, the audio-processing algorithm will have a decrease in performance and, in some cases, will not be able to perform at all. A result of such behavior is a processing system that performs worse than the problem the algorithm was designed to prevent.

Another drawback to measurement of the audio environment is power usage. In a simplex communications system, power usage is critical because such a system typically uses batteries for the supply of power. If the audio environment were to be measured more often, then, as the monitoring uses up more battery power, less battery power is available for communications.

SUMMARY OF THE INVENTION

Accordingly, the invention provides a method and device for maintaining environmental audio awareness in a simplex communications system that overcomes the hereinafore-mentioned disadvantages of the heretofore-known devices and methods of this general type and that improves environmental audio responsiveness and power usage in a simplex communications system.

Audio processing according to the invention samples the audio environment in a particularly selective way and employs a reduced functional sub-set of the communications unit when performing the sampling.

With the foregoing and other objects in view, there is provided, in accordance with the invention, a method for maintaining environmental audio awareness in a simplex communications system, including the steps of selectively activating a minimum functionality necessary for environmental sampling in a simplex communications unit and sampling audio of a surrounding environment with the minimum functionality for a given sampling time period and determining, throughout the given sampling time period, if an interruption occurs during the given sampling time period and, if not, completing the audio sampling, turning off the minimum functionality if communication is not being performed with the unit, and calculating environmental parameters for adapting communications with the unit, and if so, turning off the minimum functionality when communication is not being performed with the unit.

In accordance with another mode of the invention, the selective activation of the minimum functionality step is carried out by determining if the minimum functionality is already on and, if the minimum functionality is on, then beginning to sample audio of a surrounding environment with the minimum functionality for a given sampling time period, and, if the minimum functionality is off, then turning on only the minimum functionality and beginning to sample audio of the environment with the minimum functionality for the given sampling time period.

In accordance with a further mode of the invention, the simplex communications unit is a two-way radio.

In accordance with an added mode of the invention, the minimum functionality includes at least one of a group consisting of an audio input unit, an analog-to-digital converter, an environmental sampler, a switch, and an audio processor.

In accordance with an additional mode of the invention, there is provided the step of performing the environmental sampling through a microphone.

In accordance with yet another mode of the invention, the step of turning on only the minimum functionality is carried out by only turning on the minimum functionality to enable audio processing taking into account the environment and, thereby, to reduce battery use.

In accordance with yet a further mode of the invention, there is provided the step of beginning to sample the environment immediately after the unit is turned on.

In accordance with yet an added mode of the invention, there is provided the step of resetting and starting a delay timer upon startup of the unit to effect a waiting period before starting to sample the environment. Preferably, the delay timer is programmable.

In accordance with yet an additional mode of the invention, before starting to sample the environment, there are provided the steps of waiting for a given time period, starting a sampling timer simultaneously with starting of the audio sampling, and stopping audio sampling when the sampling timer expires.

In accordance with again another mode of the invention, there is provided the step of stopping the audio sampling by inquiring if the sampling timer has expired and, if so, stopping the audio sampling and, if not, decrementing the sampling timer and continuing to sample until the sampling timer has expired and, then, stopping the audio sampling.

In accordance with again a further mode of the invention, the given sampling time period is at least one of variable and user-selectable.

In accordance with again an added mode of the invention, the interruption is one of an activation of transmission through the communications unit, a deactivation of transmission through the communications unit, and a turning off of the communications unit.

In accordance with again an additional mode of the invention, there are provided the steps of defining a given number of samples to be taken during the given sampling time period and completing the audio sampling by sampling the given number of samples.

In accordance with still another mode of the invention, there is provided the step of turning off of the minimum functionality immediately after completion of the audio sampling.

In accordance with still a further mode of the invention, there is provided the step of calculating the environmental parameters by employing processing algorithms to compensate for the environment detected.

In accordance with still an added mode of the invention, there is provided the step of calculating the environmental parameters by employing processing algorithms and compensating for the environment detected.

In accordance with still an additional mode of the invention, there is provided the step of calculating the environmental parameters by employing processing algorithms of the unit and subsequently adjusting the unit to compensate for the environment detected.

In accordance with another mode of the invention, the audio sampling is discarded if an interruption occurs during the given sampling time period.

In accordance with a further mode of the invention, the environmental sampling is carried out while the unit is transmitting and/or while the unit is receiving and/or while the unit is inactive.

In accordance with an added mode of the invention, the steps of determining if a minimum functionality necessary for environmental sampling in a simplex communications unit is already on and of determining if an interruption occurs are periodically repeated.

In accordance with an additional mode of the invention, the steps of selectively activating the minimum functionality and of determining if an interruption occurs are periodically repeated.

In accordance with yet another mode of the invention, there is provided the step of waiting for a given time period between each successive repetition.

In accordance with yet a further mode of the invention, the repetition is carried at a given sampling rate. Preferably, the given sampling rate is at least one of variable and user-selectable.

With the objects of the invention in view, there is also provided a method for maintaining environmental audio awareness in a simplex communications system, including the steps of selectively activating a minimum functionality necessary for environmental sampling in a simplex communications unit and sampling audio of a surrounding environment with the minimum functionality for a given sampling time period, completing the audio sampling while no interruption occurs during the given sampling time period, and turning off the minimum functionality after the audio sampling is complete if communication is not being performed with the unit.

In accordance with yet an added mode of the invention, there is provided the step of calculating environmental parameters for adapting communications with the unit.

With the objects of the invention in view, there is also provided a method for maintaining environmental audio awareness in a simplex communications system, including the steps of determining if a minimum functionality necessary for environmental sampling in a simplex communications unit is already on and, if the minimum functionality is on, then beginning to sample audio of a surrounding environment with the minimum functionality for a given sampling time period and, if the minimum functionality is off, then turning on only the minimum functionality and beginning to sample audio of the environment with the minimum functionality for the given sampling time period, and determining, throughout the given sampling time period, if an interruption occurs during the given sampling time period and, if not, completing the audio sampling, turning off the minimum functionality if communication is not being performed with the unit, and calculating environmental parameters for adapting communications with the unit, and, if so, turning off the minimum functionality when communication is not being performed with the unit.

With the objects of the invention in view, there is also provided a method for maintaining environmental audio awareness in a simplex communications system, including the steps of determining if a minimum functionality necessary for environmental sampling in a simplex communications unit is already on and, if the minimum functionality is on, then, at least while the unit is at least one of transmitting and receiving, beginning to sample audio of a surrounding environment with the minimum functionality for a sampling time period, the sampling time period being programmable, and, if the minimum functionality is off, then turning on only the minimum functionality to enable audio processing taking into account the environment and, thereby, reducing battery use, and beginning to sample audio of the environment with the minimum functionality for the sampling time period, determining, throughout the sampling time period, if an interruption occurs during the sampling time period and, if not, completing the audio sampling, turning off the minimum functionality if communication is not being performed with the unit, and calculating environmental parameters for adapting communications with the unit by employing processing algorithms to compensate for the environment detected, and, if so, turning off the minimum functionality when communication is not being performed with the unit, and, periodically repeating at a programmable sampling rate the steps of determining if a minimum functionality necessary for environmental sampling in a simplex communications unit is already on and of determining if an interruption occurs.

With the objects of the invention in view, there is also provided a device for maintaining environmental audio awareness in a simplex communications system, including first means for determining if a minimum functionality necessary for environmental sampling in a simplex communications unit is already on, the first determining means beginning to sample audio of a surrounding environment with the minimum functionality for a given sampling time period if the minimum functionality is on and the first determining means turning on only the minimum functionality and beginning to sample audio of the environment with the minimum functionality for the given sampling time period if the minimum functionality is off, and second means for determining, throughout the given sampling time period, if an interruption occurs during the given sampling time period and, if the interruption does not occur, the second determining means completing the audio sampling, turning off the minimum functionality if communication is not being performed with the unit, and calculating environmental parameters for adapting communications with the unit, and, if the interruption occurs, the second determining means turning off the minimum functionality when communication is not being performed with the unit.

Other features that are considered as characteristic for the invention are set forth in the appended claims.

Although the invention is illustrated and described herein as embodied in a method and device for maintaining environmental audio awareness in a simplex communications system, it is, nevertheless, not intended to be limited to the details shown because various modifications and structural changes may be made therein without departing from the spirit of the invention and within the scope and range of equivalents of the claims.

The construction and method of operation of the invention, together with additional objects and advantages thereof, will be best understood from the description of the preferred embodiments when read in connection with the accompanying drawings.

DESCRIPTION OF THE PREFERRED EMBODIMENTS

To improve audio processing in a simplex communications system having push-to-talk ("PTT") activation of the input unit (i.e., microphone) while still maintaining the most efficient use of battery power, the invention monitors the input unit path and determines when to sample the audio environment. The monitoring is performed not by enabling the entire receiving and transmitting functional systems of the communications unit, but by only activating the minimum amount of monitoring functionality in the unit to enable audio processing taking into account the current environment of the unit.

Figure 1:
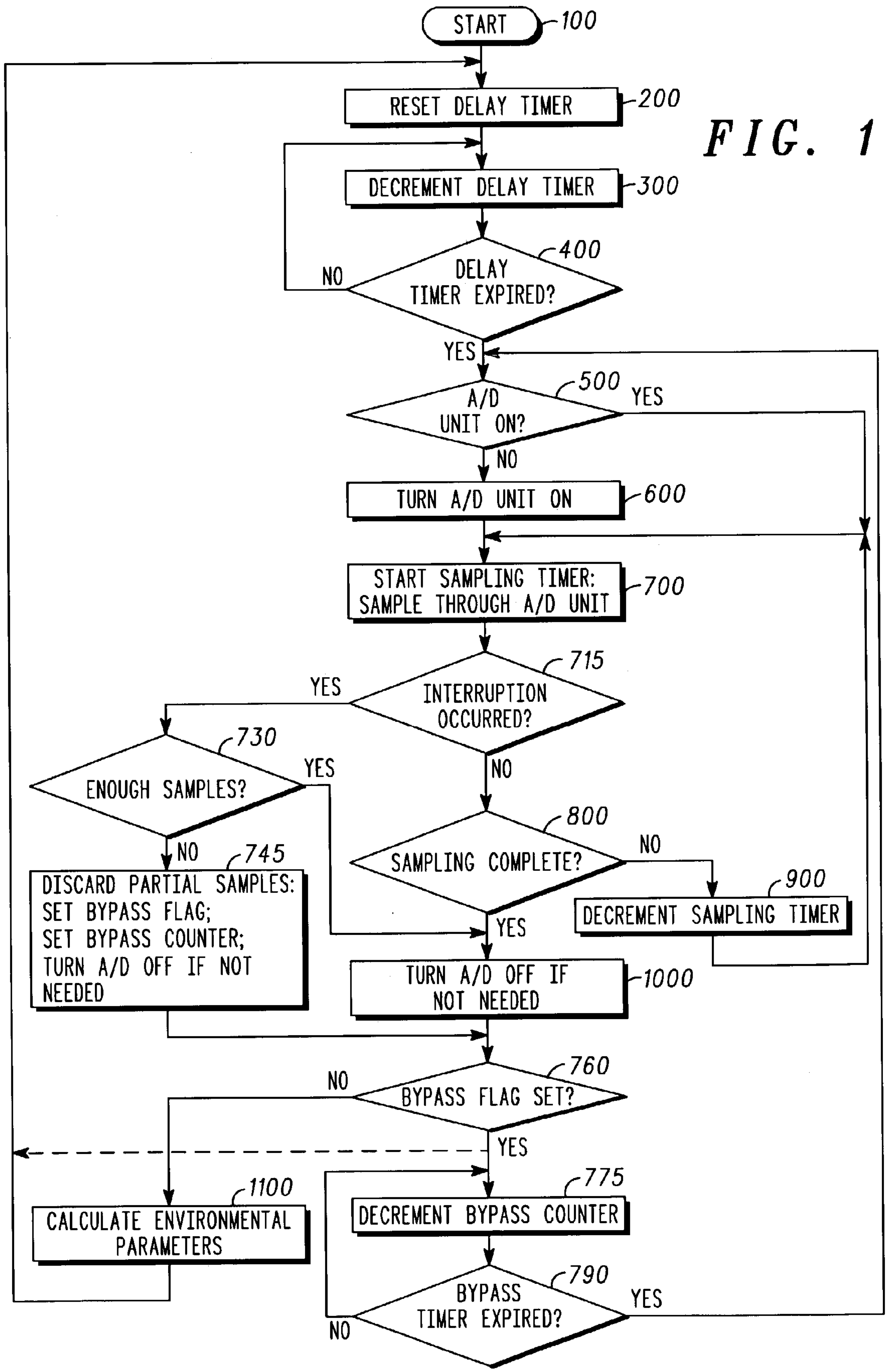
FIG. 1 is a flow chart illustrating an exemplary embodiment of the method according to the invention.

The method is described in conjunction with the flow chart of FIG. 1.

Periodic environmental sampling through an input path occurs with the invention. Upon startup of a simplex communications system (see step 100), a delay timer is reset and started to effect a waiting period before environmental sampling occurs. See step 200. The delay timer can be realized by any kind of electronic countdown or timing circuit or software, preferably, one that is user- or manufacturer-programmable. It is possible to dispense with the delay timer altogether and begin environmental sampling immediately after a communications unit is turned on. However, it is preferable to have the delay timer so that there is sufficient time for the communications unit to "warm up." In other words, the unit may have to perform some diagnostics or other internal functions that take some time, even if these functions only take a very short time to complete. It is also noted that, the delay timer can be started upon initiation of every new simplex conversation.

The delay timer counts down until expiration (see steps 300 and 400). Then, a query is performed in step 500 to determine if the input unit (i.e., microphone) and the functionality for processing information received by the input unit are currently on. Such functionality typically includes an analog-to-digital converting system for electronically obtaining audio information through a microphone. Also provided therewith is a processing unit for configuring the obtained audio information into a form that can be used by the unit for adapting unit performance based upon awareness of the surrounding environment. Therefore, the combination of the input unit, the analog-to-digital converting system, and the processing unit will be referred to herein as an A/D unit or as a minimum functionality necessary for environmental sampling in the communications unit. Accordingly, the step 500 inquiry determines if the A/D unit is turned on. The A/D unit would be turned on, for example, if the user's communication unit were presently transmitting audio received through the microphone of the unit.

If the answer to the query in step 500 is yes, environmental sampling starts through the A/D unit at the same time a sampling countdown timer is set. See step 700. Thus, according to the invention, environmental sampling can occur even while the user transmits. Alternatively, instead of starting at the same time as the setting of the countdown timer, environmental sampling can start before or after the timer is set. Preferably, however, the sampling and the start of the timer are simultaneous. The action of setting the sampling countdown timer, in the context of the invention, includes, possibly, also defining a given number of samples to be taken during the given sampling time period or defining the sampling time period to be sufficiently long enough to include the needed number of samples for the particular environmental processing algorithm.

If the answer to the query in step 500 is no, then the A/D unit is, first, turned on in step 600. Environmental sampling starts thereafter in step 700, along with the setting of the countdown timer. It is noted that the entire transmitting functionality of the user's communications unit, from receiving audio over the microphone to transmission through the antenna or other such device, need not be turned on to perform environmental sampling according to the invention. Only that particular functionality necessary for environmental sampling is turned on if the transmission functionality is not required. Such a situation occurs, most typically, when the communications unit is on but is not transmitting and/or receiving. These measures ensure the most efficient use of battery power while still enabling adequate communication that takes into account the environmental influences.

The above description regarding steps 200 to 600 relates to a control of the minimum functionality. Simply put, these steps perform a selective control of the minimum functionality. Such selective control conserves battery power while the minimum functionality is being activated. Selective control, at it is referred to herein, can mean, for example, that, if the minimum functionality is already on, then sampling of audio of a surrounding environment with the minimum functionality is performed, but, if the minimum functionality is off, then only the minimum functionality is turned on and the sampling of audio of the environment with the minimum functionality is performed.

Environmental sampling continues for as long as is necessary to record the type of environment experienced by the user. The duration of environmental sampling can, for example, be performed by inquiring if the sampling timer has expired (see step 800) and, if not, decrementing the sampling timer in step 900 and continuing to sample with the A/D unit.

The duration of such sampling will be referred to herein as the sampling time, which is dependent upon the hardware and software used to perform the sampling, and is particularly dependent upon the environmental sampling algorithms used. Therefore, the sampling time will vary. It could be measured in seconds, milliseconds, or, even, microseconds, for example.

When enough environmental sampling has occurred over the sampling time without interruption (see step 715 below), then the A/D unit is turned off in step 1000 (unless it is otherwise being used for concurrent transmission), and environmental parameters are calculated in step 1100. Finally, the delay timer is reset and started, one again, in step 200 for the next sampling. If the delay timer has a value that is too short or too long for the desired time between two successive samplings, then another timer can be provided and used immediately after calculation of the environmental parameters. After expiration of this other timer, the method would continue from step 500.

The time between such samples for calculating environmental parameters (i.e., between step 200 and step 1100 without interruption) will be referred to herein as the sampling rate. Similar to the sampling time, the sampling rate is dependent upon the hardware and software used to perform the sampling, and can also be dependent upon the environmental sampling algorithms used. Therefore, the sampling rate will vary. It could be measured in seconds, milliseconds, or, even, microseconds, for example.

Calculation of environmental parameters, in the case of the invention, is more than just detecting volume levels or equalization levels, for example. Once enough samplings are taken, environmental parameters are calculated by employing processing algorithms residing within the communications unit and, then, by adjusting the unit to compensate for the detected environment, thus, providing the user with an enhanced ability to communicate in spite of the surrounding environmental conditions. It is noted that a detailed discussion of the particular algorithms or the particular adjustments made is not necessary for understanding the method according to the invention because the method can be employed independent from any particular kind of algorithm or any variation of adjustment. It is sufficient, for purposes of understanding the invention of the instant application, to note that processing algorithms are employed and adjustments are made after enough audio environment samplings are taken, whether or not the A/D unit is turned off.

The above sampling process occurs without change if the entirety of the environmental sampling can be performed without interruption. In such a context, interruption can be defined, for example, as a beginning or an end of an actual transmission by the communications unit. It is called an interruption because it is possible to impair the environmental sampling. For example, the pressing or letting go of the transmit button (i.e., of the PTT sub-system) can cause pops or clicks that would skew or entirely throw off an environmental measurement. Another example interruption can be a turning off of the audio unit either by the user or due to a low battery. An interruption, in the context of the invention, includes any condition experienced by the user's communications unit that would detrimentally affect proper environmental sampling. Preferably, the condition is predefined. Therefore, if environmental sampling (steps 700 and 800) is taking place when an interruption occurs, then some kind of correction is warranted and is performed.

According to the invention, therefore, in step 715, a query is conducted throughout the time of environmental sampling (whether sampling is periodic or continuous) to determine if an interruption has occurred. If no interruption has occurred, then sampling continues as set forth above. See steps 800, 900, 1000, 1100. If, however, an interruption does occur, then another query is performed in step 730 to determine if enough environmental samples have been taken to perform adequate calculation of environmental parameters. An example of an interruption during the environmental sampling can be a user's initiation or termination of a microphone request (i.e., PTT).

If there are enough samples, then processing continues as if sampling was complete (i.e., step 800). If there is an insufficient quantity of environmental samples taken so far, all partial environmental samples stored by the communications unit are discarded and an interruption bypass timer and bypass flag are set in step 745. Discarding of the currently stored partial samples can occur, for example, by erasure or zeroing out. If the A/D unit is not needed, then it is turned off.

To appropriately check if the calculation of environmental parameters is to be bypassed, inquiry step 760 is performed between steps 1000 and 1100. This inquiry determines if the bypass flag has been set. If no flag has been set, then no interruption has occurred, and calculation of environmental parameters is performed as set forth above. If, however, the bypass flag has been set, then it is understood that an interruption has occurred and bypass of the calculation of environmental parameters in step 1100 is necessary.

Interruptions typically take an amount of time that is long with regard to microcomputer processing timeframes. Therefore, preferably, a bypass delay time is imposed before beginning a new environmental sampling. The bypass delay can, in particular, be carried out by decrementing the bypass counter in step 775 and, then, inquiring, in step 790, if the bypass counter has expired. If not, then the counter continues to be decremented until expiration. In this embodiment, the bypass timer is functionally defined as separate from the delay timer of steps 200 to 400. Alternatively, the bypass time can be the same as the delay time of the delay timer and, therefore, instead of steps 775 and 790, the functionality can continue from step 760 directly to step 200. Such an embodiment is illustrated in FIG. 1 with a dashed arrow. To implement differing times of the start delay and the bypass delay, the unit can be programmed to set the delay timer, upon startup, to be one value, and to set the bypass timer to be another value. Also, these timers can be user- or manufacturer-programmable.

As an alternative to the above bypass procedure, the bypass flag can be eliminated along with the step 760 bypass inquiry. In such a case, the remaining functions of step 745 would be completed and steps 775 and 790 would be carried out thereafter.

Figure 2:
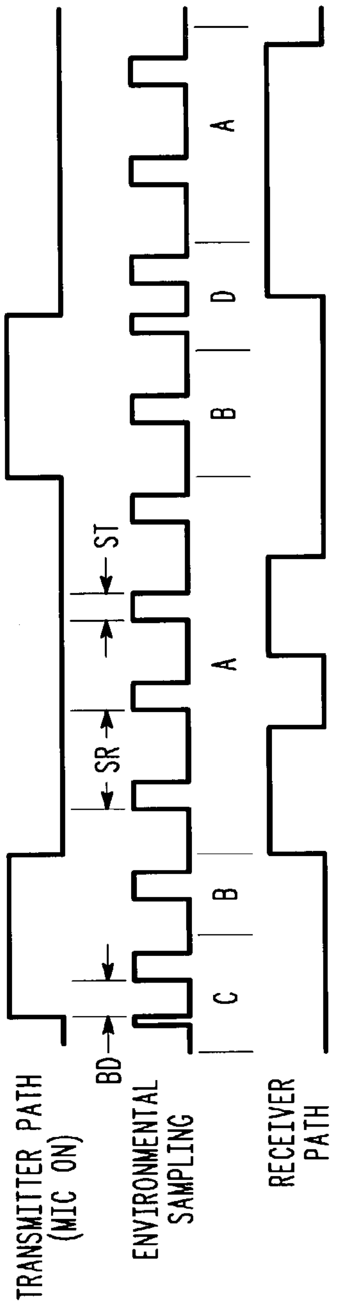
FIG. 2 is a fragmentary signal timing diagram applying the method of FIG. 1.

The timing diagram illustrating various sampling scenarios can be seen in FIG. 2.

The top timing trace in FIG. 2 indicates when the transmit path of the user's communications unit has been activated by the user. Two of such user activations are shown within the top timing trace. For each of the activations, the rising edge indicates the instance when the user started transmitting, and the falling edge indicates when the user ended transmission.

The middle timing trace in FIG. 2 indicates when the user's communications unit performs environmental sampling. Twelve of such sampling activations are shown in the middle timing trace. For each of the sampling activations, the rising edge indicates the instance when sampling started and the falling edge indicates when the sampling ended. As can be seen, environmental sampling instances are periodic with discontinuities occurring upon rising and falling edges of the top timing trace. These features will be discussed in more detail below.

The bottom timing trace in FIG. 2 indicates when the user's communications unit received a transmission from another different user. Three of such receiving activations are shown in the middle timing trace. For each of the receiving activations, the rising edge indicates the instance when the user started receiving the other user's transmission and the falling edge indicates when the user finished receiving the other user's transmission.

Four sampling scenarios will be discussed in the following text to illustrate the method according to the invention as set forth above. The scenarios are illustrated with four time segments A, B, C, and D on the middle timing trace of FIG. 2. In these scenarios, it is assumed that the only kind of interruption is a user's transmission. Of course, any other kind of interruption can occur and will be treated in the same or similar way as a user transmission interruption.

During each of the time segments A, no user transmission occurs. Therefore, environmental sampling occurs without interruption and repeats as defined by the particular sampling rate applied. As can be seen in the middle trace of FIG. 2, the sampling rate SR is measured by the distance between the rising edges of two successive environmental sampling pulses. Also illustrated in the middle trace of FIG. 2 is the sampling time ST, which is measured by the width of the individual environmental sampling pulse. Periodic environmental sampling continues throughout the inactive transmit time of segment A. In the first time segment A, the user's transmission unit is shown as sampling the surrounding environment four times.

During each of the two time segments B, continuous user transmission occurs from before a start of a single environmental sampling until after the end of the single environmental sampling. Thus, the user's input unit (i.e., microphone path) is already turned on when sampling begins, which sampling continues and completes during the active transmission. Because there is no interruption during each of the two time segments B, the user's transmission unit samples the surrounding environment during the single illustrated sampling.

In contrast to time segments A and B, during time segment C, the user starts to transmit approximately at the middle of the environmental sampling. Therefore, the step 715 inquiry is positive and the step 730 inquiry as to whether or not enough samples have been taken so far is conducted. It is assumed, in this exemplary scenario, that the answer is no. Therefore, all partial samples are discarded (see steps 745 and 760) and a bypass delay is effected. See steps 775 and 790. Because samples are no longer necessary, sampling, then, stops, as indicated by the narrowed first pulse in the middle trace of FIG. 2. As can also be seen in the middle trace of FIG. 2, the bypass delay BD—in other words, the time until the next sampling begins—is shorter than the sampling rate SR. It is also possible to set the bypass delay to immediately begin environmental sampling. In time segment C, the restarted sampling is completed before the end of the user's transmit cycle.

Time segment D is similar to time segment C, except the user's end of transmission occurs during the environmental sampling. Simply put, environmental sampling was being performed and was interrupted by the user turning off the microphone path before the environmental parameters could be calculated. The result is the same as in time segment C, in that all partial samples are discarded (see steps 745 and 760) and a bypass delay is effected. See steps 775 and 790. The stoppage of sampling is, similarly, indicated by the narrowed ninth pulse in the middle trace of FIG. 2.

As set forth above, if the user is not transmitting during sampling, as shown in each of the time segments A, the environmental sampling according to the method of the invention only turns on the specific hardware and software blocks on the transmit side of the communications unit required to update the environmental parameters. Such periodic sampling does not enable the user's transmitter, which results in a minimal drain on the battery.

Figure 3:
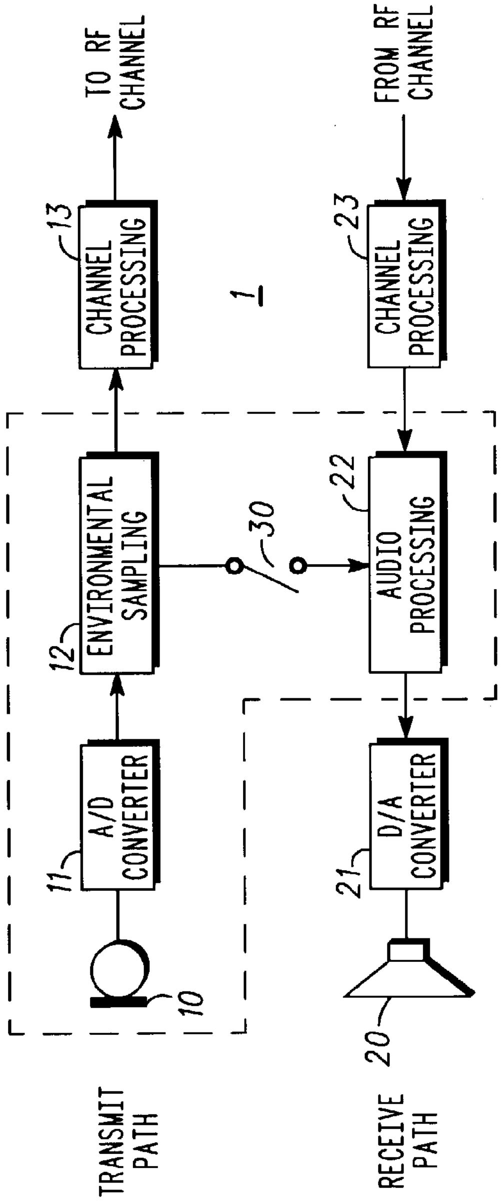
FIG. 3 is block circuit diagram of a communications unit for use with the method according to the invention.

FIG. 3 illustrates an example configuration, in block diagram form, of a simplex user communications unit 1 that can be employed according to the invention. The unit 1 has both a transmit path and a receive path. The transmit path contains first, in a direction from the user towards the communications channel (i.e., a radio-frequency ("RF") channel), an input unit 10 (i.e., one or more microphones) for receiving the user's message (i.e., audio of the user's voice). Connected to the microphone 10 in the transmit path is a unit 11 for converting the analog signal received by the microphone into a digital signal, in other words, an analog-to-digital converter, referred to herein as an A/D converter. Both the microphone and the A/D converter are, typically, realized with hardware.

Continuing in the transmit path, connected to the A/D converter 11 is an environmental sampler 12 for taking the digital signal from the A/D converter 11 and sampling portions of the signal for later audio processing. After, or simultaneously with environmental sampling, channel processing is performed by a transmit channel processor 13. FIG. 3 only illustrates the environmental sampler 12 connected serially to the transmit channel processor 13. The channel processor also can be connected to the A/D converter in parallel if environmental sampling is not needed for channel processing. The environmental sampler 12 and the transmit channel processor 13 are typically performed by executing software running on the unit 1. However, such functions can also be performed at least partially with dedicated hardware.

For transmission to another user, the transmit channel processor 13 sends the processed transmission over a communications channel. In a two-way hand-held radio, for example, the channel processor 13 will be connected to an antenna for transmission of the user's message over the RF channel.

For reception from another user, a reception channel processor 23 receives a transmission over the communications channel. In the two-way hand-held radio example, the reception channel processor 23 will be connected to the antenna for reception of the other user's message over the RF channel.

Connected to the reception channel processor 23 in a direction from the communications channel towards the user is a reception audio processor 22. This reception audio processor 22 is not simply a processor for communications received by another user over a communications channel. Additionally, the reception audio processor 22 processes the data provided by the environmental sampler 12. Thus, the reception audio processor 22 is connected to the environmental sampler 12 not by a constant link, but by a switch 30 that is controlled according to the method of the invention as set forth above. For example, when the switch is closed for a time period defined by the switching time ST, the reception audio processor 22 receives and processes the environmental sampling data information representing the current environmental conditions experienced by the unit 1. The time period between a first closure of the switch 30 and a second closure of the switch 30, correspondingly, defines the switching rate SR. The switch 30 can be implemented merely by software or can be any combination of hardware and software.

Connected to the reception audio processor 22, still in a direction from the communications channel towards the user is a digital-to-analog converter 21 ("D/A converter"), which is, in turn, connected to an output unit 20. (i.e., one or more speakers). Both the speaker 20 and the D/A converter 21 are, typically, realized with hardware.

To implement the battery conservation feature of the invention as set forth above, only a minimal amount of monitoring functionality is activated in the unit 1 to enable audio processing of the unit's current environment. The dashed line encircling the input unit 10, the A/D converter 11, the environmental sampler 12, the switch 30, and the reception audio processor 22 delineates this minimal amount of functionality.

Of course, the block diagram of FIG. 3 is an extreme simplification of the simplex communications unit 1 for carrying out the method according to the invention. The method should not be limited to the details shown because various modifications and structural changes may be made therein without departing from the spirit of the invention.

The method according to the invention can be employed in any audio device utilizing audio processing algorithms that rely on current environmental conditions. In particular, the method can be employed in any simplex communications system where the environmental audio conditions affect performance thereof.

The illustrated example is only one possible scenario in a variety of many different scenarios possible for sampling to correctly determine environmental conditions and to compensate therefor while simultaneously conserving battery life.

The method according to the invention allows for duplex dependent audio algorithms to run on a simplex system, duplex dependent algorithms being those algorithms that require current information from one path or channel (i.e., transmit) that will, in real-time, influence the characteristics of the other path or channel (i.e., receive).

We claim:

1. A method for maintaining environmental audio awareness in a simplex communications system, which comprises:

selectively activating a minimum functionality necessary for environmental sampling in a simplex communications unit and sampling audio of a surrounding environment with the minimum functionality for a given sampling time period; and determining, throughout the given sampling time period, if an interruption occurs during the given sampling time period and:

if not:

completing the audio sampling;

turning off the minimum functionality if communication is not being performed with the unit; and calculating environmental parameters for adapting communications with the unit; and if so, turning off the minimum functionality when communication is not being performed with the unit.

2. The method according to claim 1, which further comprises carrying out the selective activation of the minimum functionality by determining if the minimum functionality is already on and:

if the minimum functionality is on, then beginning to sample audio of a surrounding environment with the minimum functionality for a given sampling time period; and if the minimum functionality is off, then turning on only the minimum functionality and beginning to sample audio of the environment with the minimum functionality for the given sampling time period.

3. The method according to claim 2, which further comprises carrying out the step of turning on only the minimum functionality by only turning on the minimum functionality to enable audio processing taking into account the environment and, thereby, to reduce battery use.

4. The method according to claim 2, which further comprises periodically repeating the steps of determining if a minimum functionality necessary for environmental sampling in a simplex communications unit is already on and of determining if an interruption occurs.

5. The method according to claim 4, which further comprises carrying out the repetition at a given sampling rate.

6. The method according to claim 1, wherein the simplex communications unit is a two-way radio.

7. The method according to claim 1, wherein the minimum functionality includes at least one of a group consisting of an audio input unit, an analog-to-digital converter, an environmental sampler, a switch, and an audio processor.

8. The method according to claim 1, which further comprises performing the environmental sampling through a microphone.

9. The method according to claim 1, which further comprises beginning to sample the environment immediately after the unit is turned on.

10. The method according to claim 1, which further comprises resetting and starting a delay timer upon startup of the unit to effect a waiting period before starting to sample the environment.

11. The method according to claim 10, wherein the delay timer is programmable.

12. The method according to claim 1, which further comprises, before starting to sample the environment, waiting for a given time period.

13. The method according to claim 1, which further comprises:

starting a sampling timer simultaneously with starting of the audio sampling; and stopping audio sampling when the sampling timer expires.

14. The method according to claim 13, which further comprises stopping the audio sampling by inquiring if the sampling timer has expired and:

if so, stopping the audio sampling; and if not, decrementing the sampling timer and continuing to sample until the sampling timer has expired and, then, stopping the audio sampling.

15. The method according to claim 1, wherein the given sampling time period is at least one of variable and user-selectable.

16. The method according to claim 1, wherein the interruption is one of an activation of transmission through the communications unit, a deactivation of transmission through the communications unit, and a turning off of the communications unit.

17. The method according to claim 1, which further comprises:

defining a given number of samples to be taken during the given sampling time period; and completing the audio sampling by sampling the given number of samples.

18. The method according to claim 1, which further comprises carrying out the step of turning off of the minimum functionality immediately after completion of the audio sampling.

19. The method according to claim 1, which further comprises carrying out the step of calculation of the environmental parameters by employing processing algorithms to compensate for the environment detected.

20. The method according to claim 1, which further comprises carrying out the step of calculation of the environmental parameters by employing processing algorithms and compensating for the environment detected.

21. The method according to claim 1, which further comprises carrying out the step of calculation of the environmental parameters by employing processing algorithms of the unit and subsequently adjusting the unit to compensate for the environment detected.

22. The method according to claim 1, which further comprises discarding the audio sampling if an interruption occurs during the given sampling time period.

23. The method according to claim 1, which further comprises carrying out the environmental sampling one of:

while the unit is inactive;

while the unit is transmitting; and while the unit is receiving.

24. The method according to claim 1, which further comprises periodically repeating the steps of selectively activating the minimum functionality and of determining if an interruption occurs.

25. The method according to claim 24, which further comprises waiting for a given time period between each successive repetition.

26. The method according to claim 25, wherein the given sampling rate is at least one of variable and user-selectable.

27. A method for maintaining environmental audio awareness in a simplex communications system, which comprises:

selectively activating a minimum functionality necessary for environmental sampling in a simplex communications unit and sampling audio of a surrounding environment with the minimum functionality for a given sampling time period;

completing the audio sampling while no interruption occurs during the given sampling time period; and turning off the minimum functionality after the audio sampling is complete if communication is not being performed with the unit.

28. The method according to claim 27, which further comprises calculating environmental parameters for adapting communications with the unit.

29. A method for maintaining environmental audio awareness in a simplex communications system, which comprises:

determining if a minimum functionality necessary for environmental sampling in a simplex communications unit is already on and:

if the minimum functionality is on, then beginning to sample audio of a surrounding environment with the minimum functionality for a given sampling time period; and if the minimum functionality is off, then turning on only the minimum functionality and beginning to sample audio of the environment with the minimum functionality for the given sampling time period; and determining, throughout the given sampling time period, if an interruption occurs during the given sampling time period and:

if not:

completing the audio sampling;

turning off the minimum functionality if communication is not being performed with the unit; and calculating environmental parameters for adapting communications with the unit; and if so, turning off the minimum functionality when communication is not being performed with the unit.

30. A method for maintaining environmental audio awareness in a simplex communications system, which comprises:

determining if a minimum functionality necessary for environmental sampling in a simplex communications unit is already on and:

if the minimum functionality is on, then, at least while the unit is at least one of transmitting and receiving, beginning to sample audio of a surrounding environment with the minimum functionality for a sampling time period, the sampling time period being programmable; and if the minimum functionality is off, then turning on only the minimum functionality to enable audio processing taking into account the environment and, thereby, reducing battery use, and beginning to sample audio of the environment with the minimum functionality for the sampling time period;

determining, throughout the sampling time period, if an interruption occurs during the sampling time period and:

if not:

completing the audio sampling;

turning off the minimum functionality if communication is not being performed with the unit; and calculating environmental parameters for adapting communications with the unit by employing processing algorithms to compensate for the environment detected; and if so, turning off the minimum functionality when communication is not being performed with the unit; and periodically repeating at a programmable sampling rate the steps of determining if a minimum functionality necessary for environmental sampling in a simplex communications unit is already on and of determining if an interruption occurs.

31. A device for maintaining environmental audio awareness in a simplex communications system, which comprises:

first means for determining if a minimum functionality necessary for environmental sampling in a simplex communications unit is already on and:

said first determining means beginning to sample audio of a surrounding environment with the minimum functionality for a given sampling time period if the minimum functionality is on; and said first determining means turning on only the minimum functionality and beginning to sample audio of the environment with the minimum functionality for the given sampling time period if the minimum functionality is off; and second means for determining, throughout the given sampling time period, if an interruption occurs during the given sampling time period and:

if the interruption does not occur, said second determining means completing the audio sampling, turning off the minimum functionality if communication is not being performed with the unit, and calculating environmental parameters for adapting communications with the unit; and if the interruption occurs, said second determining means turning off the minimum functionality when communication is not being performed with the unit.

* * * * *